United States Patent
Cass et al.

(10) Patent No.: US 9,816,441 B2
(45) Date of Patent: Nov. 14, 2017

(54) GAS TURBINE ENGINE WITH STACKED ACCESSORY COMPONENTS

(75) Inventors: Michael F. Cass, Rockford, IL (US); James S. Elder, South Windsor, CT (US); Brian D. Merry, Andover, CT (US); Gabriel L. Suciu, Glastonbury, CT (US); Christopher M. Dye, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 1967 days.

(21) Appl. No.: 12/413,634

(22) Filed: Mar. 30, 2009

(65) Prior Publication Data

US 2010/0242496 A1    Sep. 30, 2010

(51) Int. Cl.
*F02C 7/32*    (2006.01)

(52) U.S. Cl.
CPC ............ *F02C 7/32* (2013.01); *Y02T 50/671* (2013.01)

(58) Field of Classification Search
USPC .................................. 60/226.1, 802; 244/58
See application file for complete search history.

(56) References Cited

U.S. PATENT DOCUMENTS

| | | | |
|---|---|---|---|
| 2,803,943 A | 8/1957 | Rainbow | |
| 2,952,973 A * | 9/1960 | Hall et al. | 60/244 |
| 2,978,869 A * | 4/1961 | Hiscock et al. | 60/802 |
| 3,710,568 A | 1/1973 | Rice | |
| 3,722,214 A | 3/1973 | Guillot | |
| 3,830,058 A | 8/1974 | Ainsworth | |
| 3,835,642 A * | 9/1974 | Amann | 60/39.163 |
| 3,907,220 A | 9/1975 | Amelio | |
| 4,474,001 A * | 10/1984 | Griffin et al. | 60/204 |
| 4,525,995 A | 7/1985 | Clark | |
| 4,864,812 A * | 9/1989 | Rodgers et al. | 60/39.091 |
| 5,021,698 A | 6/1991 | Pullen et al. | |
| 5,103,631 A | 4/1992 | Edwards et al. | |
| 5,174,110 A | 12/1992 | Duesler et al. | |
| 5,226,288 A * | 7/1993 | Cornax | 60/226.1 |
| 5,253,470 A | 10/1993 | Newton | |
| 5,271,295 A * | 12/1993 | Marnot | 74/665 B |
| 5,303,896 A | 4/1994 | Sterka | |
| 5,315,821 A * | 5/1994 | Dunbar et al. | 60/226.1 |
| 5,349,814 A * | 9/1994 | Ciokajlo et al. | 60/226.1 |
| 5,435,124 A | 7/1995 | Sadil et al. | |
| 5,524,847 A * | 6/1996 | Brodell et al. | 244/54 |
| 5,694,765 A * | 12/1997 | Hield et al. | 60/39.163 |
| 5,867,979 A * | 2/1999 | Newton et al. | 60/226.1 |
| 6,357,220 B1 | 3/2002 | Snyder et al. | |
| 6,735,954 B2 * | 5/2004 | MacFarlane et al. | 60/793 |
| 6,765,328 B2 | 7/2004 | Razzell et al. | |

(Continued)

FOREIGN PATENT DOCUMENTS

WO    2005005810    1/2005

OTHER PUBLICATIONS

European Search Report, dated Jul. 27, 2010, EP application No. 10 25 0338.

*Primary Examiner* — Craig Kim

(74) *Attorney, Agent, or Firm* — Carlson, Gaskey & Olds, P.C.

(57) ABSTRACT

An engine accessory system for a gas turbine engine includes a first accessory component defined along an accessory axis and a second accessory component mounted to the first accessory component along the accessory axis.

30 Claims, 11 Drawing Sheets

(56) References Cited

U.S. PATENT DOCUMENTS

| | | |
|---|---|---|
| 6,825,640 B1 | 11/2004 | Hill et al. |
| 6,865,891 B2 | 3/2005 | Walsh et al. |
| 7,007,890 B2 | 3/2006 | Beutin et al. |
| 7,055,330 B2 | 6/2006 | Miller |
| 7,107,755 B2 | 9/2006 | El Hamel et al. |
| 7,107,756 B2 | 9/2006 | Rolt |
| 7,134,269 B2 | 11/2006 | Walsh et al. |
| 7,160,159 B2 | 1/2007 | Webster |
| 7,543,439 B2 * | 6/2009 | Butt et al. ................ 60/39.183 |
| 7,552,591 B2 * | 6/2009 | Bart et al. ...................... 60/792 |
| 7,690,185 B2 * | 4/2010 | Linet et al. ............... 60/39.163 |
| 7,721,551 B2 * | 5/2010 | Hanson ........................ 60/771 |
| 7,805,947 B2 * | 10/2010 | Moulebhar ................... 60/787 |
| 2005/0150204 A1 * | 7/2005 | Stretton et al. ............ 60/39.83 |
| 2005/0150234 A1 * | 7/2005 | Urso et al. .................... 60/796 |
| 2005/0183423 A1 | 8/2005 | Miller |
| 2005/0183529 A1 | 8/2005 | Miller |
| 2005/0183540 A1 * | 8/2005 | Miller ..................... 74/665 GA |
| 2006/0005547 A1 | 1/2006 | Brouillet |
| 2006/0101804 A1 * | 5/2006 | Stretton ...................... 60/226.1 |
| 2006/0248900 A1 * | 11/2006 | Suciu et al. .................. 60/802 |
| 2007/0017226 A1 | 1/2007 | Butt et al. |
| 2008/0016880 A1 * | 1/2008 | Bruno et al. ................. 60/802 |
| 2009/0000308 A1 * | 1/2009 | Cloft et al. .................. 60/802 |
| 2009/0302152 A1 * | 12/2009 | Knight ........................ 244/58 |
| 2009/0317229 A1 * | 12/2009 | Suciu et al. .................. 415/1 |

* cited by examiner

GAS TURBINE ENGINE WITH STACKED ACCESSORY COMPONENTS

BACKGROUND

The present disclosure relates to a gas turbine engine accessory gearbox, and more particularly to an integrated accessory gearbox case section which supports a multiple of accessory components.

Aircraft powered by gas turbine engines often include a mechanically driven accessory gearbox to drive accessory systems such as fuel pumps, scavenge pumps, electrical generators, hydraulic pumps, etc. These components typically operate at different speeds from one another and require differing amounts of horsepower as provided by the accessory gearbox.

Conventional gas turbine engine accessory gearboxes utilize a separate gearbox case mountable underneath the engine axially near the diffuser case. The accessory gearbox is typically crescent-shaped with forward and aft faces to which the accessory components are mounted. The accessory gearbox is driven by an angle gearbox axially forward of the accessory gearbox through a layshaft. The angle gearbox is driven by a towershaft driven by the engine high-pressure spool.

Although effective, this arrangement may utilize a relatively significant amount of space within the engine core nacelle as well as the multiple shaft and gearbox arrangement required to transfer power from the tower shaft to the independent accessory gearbox.

SUMMARY

An engine accessory system for a gas turbine engine according to an exemplary aspect of the present disclosure includes a first accessory component defined along an accessory axis and a second accessory component mounted to the first accessory component along the accessory axis.

A gas turbine engine according to an exemplary aspect of the present disclosure includes a fan case section defined about an engine axis and a core case section attached to the fan case section. An accessory gearbox case section mounted to the core case section with a geartrain within the accessory gearbox case section. A first accessory component mounted to the accessory gearbox case section along an accessory axis generally parallel to the engine axis, the first accessory component driven by said geartrain and a second accessory component mounted to the first accessory component along the accessory axis.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1A:
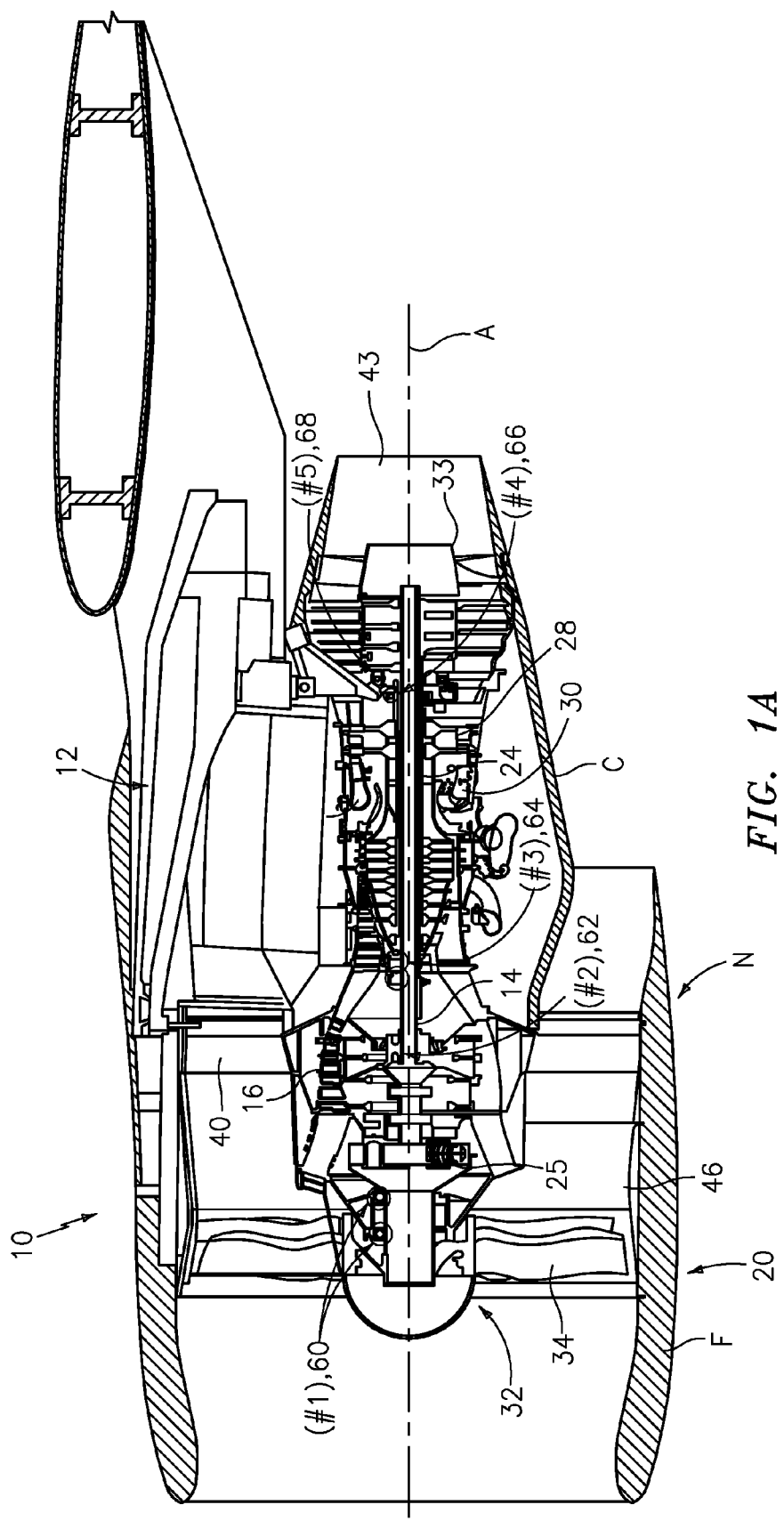
FIG. 1A is a general sectional view through a gas turbine engine along the engine longitudinal axis.
Figure 1B:
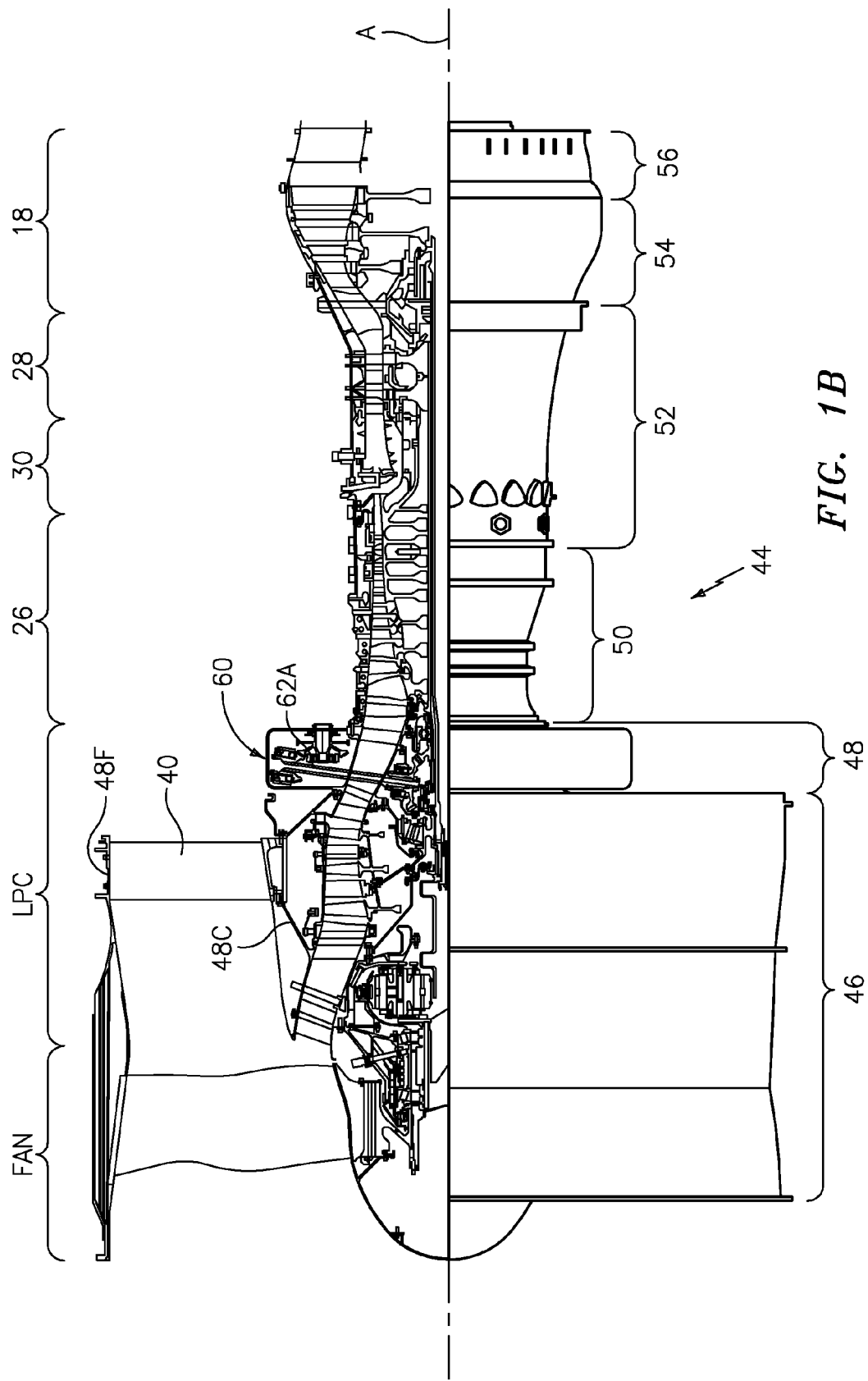
FIG. 1B is a general sectional view through a gas turbine engine along the engine longitudinal axis illustrating an engine static structure case arrangement on the lower half thereof.

FIGS. 1A and 1B illustrate a general partial fragmentary schematic view of a gas turbofan engine 10 suspended from an engine pylon 12 within an engine nacelle assembly N as is typical of an aircraft designed for subsonic operation.

The turbofan engine 10 includes a core engine within a core nacelle C that houses a low spool 14 and high spool 24. The low spool 14 includes a low pressure compressor 16 and low pressure turbine 18. The low spool 14 drives a fan section 20 connected to the low spool 14 either directly or through a gear train. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

Airflow enters the fan nacelle F which at least partially surrounds the core nacelle C. The fan section 20 communicates airflow into the core nacelle C to the low pressure compressor 16 and the high pressure compressor 26. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20. A core engine exhaust exits the core nacelle C through a core nozzle 43 defined between the core nacelle C and a tail cone 33.

The engine static structure 44 generally has sub-structures which may include a case structure often referred to as the engine backbone. The engine static structure 44 generally includes a fan case 46, an intermediate case (IMC) 48, a high pressure compressor case 50, a diffuser/turbine case 52, a low pressure turbine case 54, and a turbine exhaust case 56 (FIG. 1B). The IMC 48 is mounted between the fan case 46 and the high pressure compressor case 50.

The fan section 20 includes a fan rotor 32 with a plurality of circumferentially spaced radially outwardly extending fan blades 34. The fan blades 34 are surrounded by the fan case 46. The core engine case structure is secured to the fan case 46 at the IMC 48 which includes a multiple of circumferentially spaced radially extending fan exit guide vanes (FEGVs) 40 which radially span a core section 48C and a fan section 48F defined about the axis A.

Figure 2A:
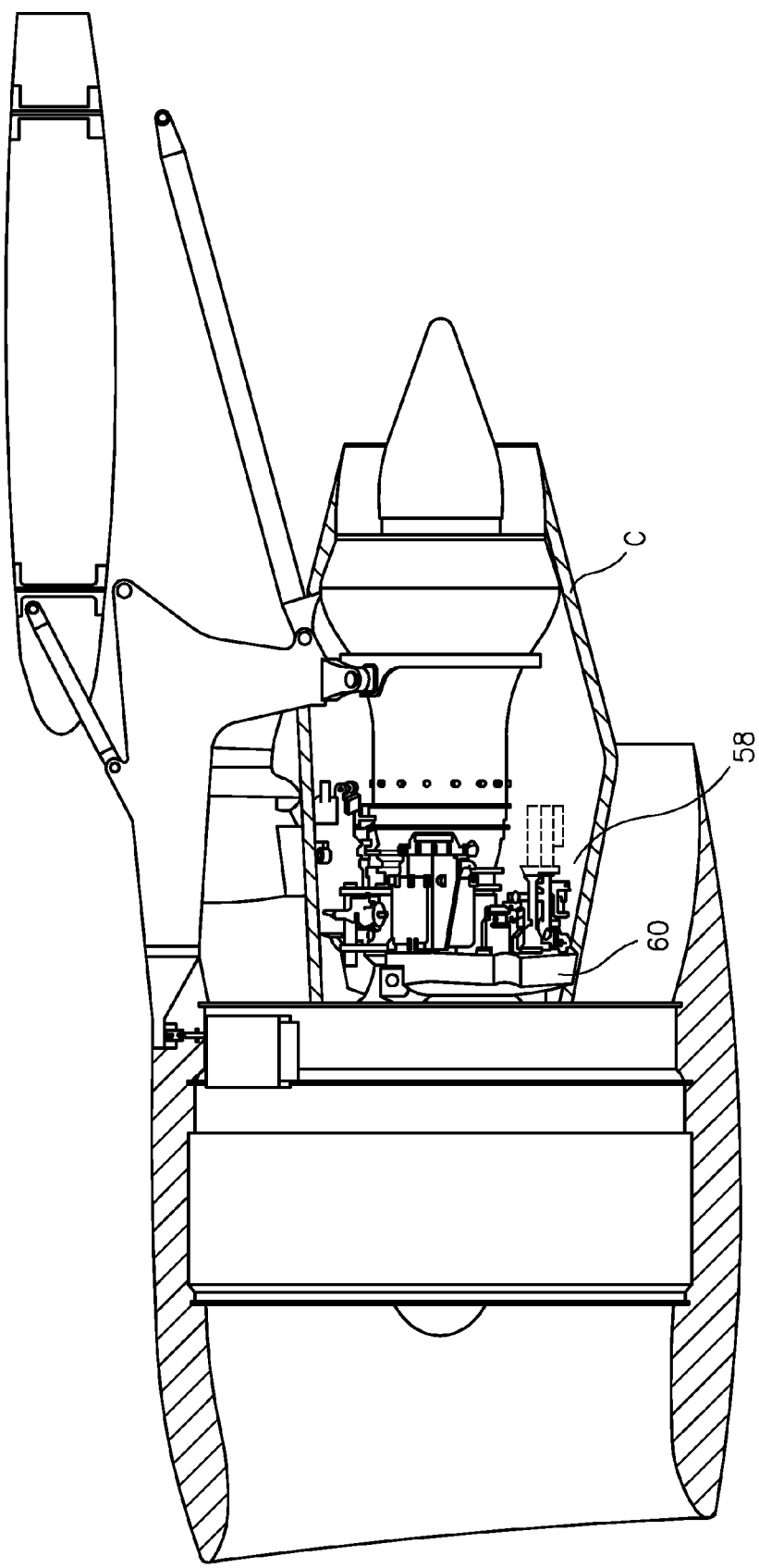
FIG. 2A is a longitudinal view of the gas turbine engine with a portion of the nacelle structure removed.
Figure 2B:
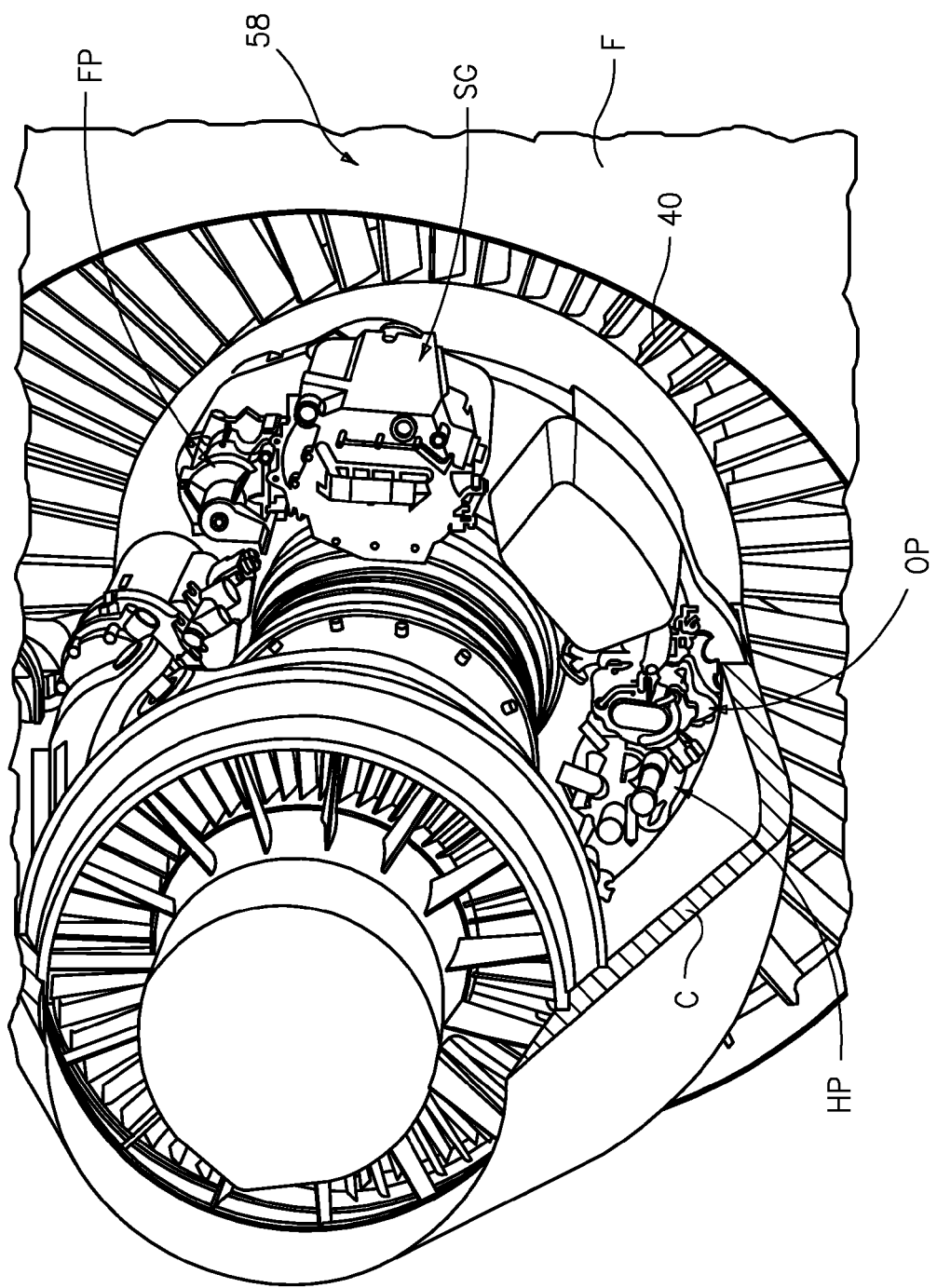
FIG. 2B is an underside port view of a gas turbine engine looking forward to illustrate the stacking of accessory components with the intermediate case.
Figure 2C:
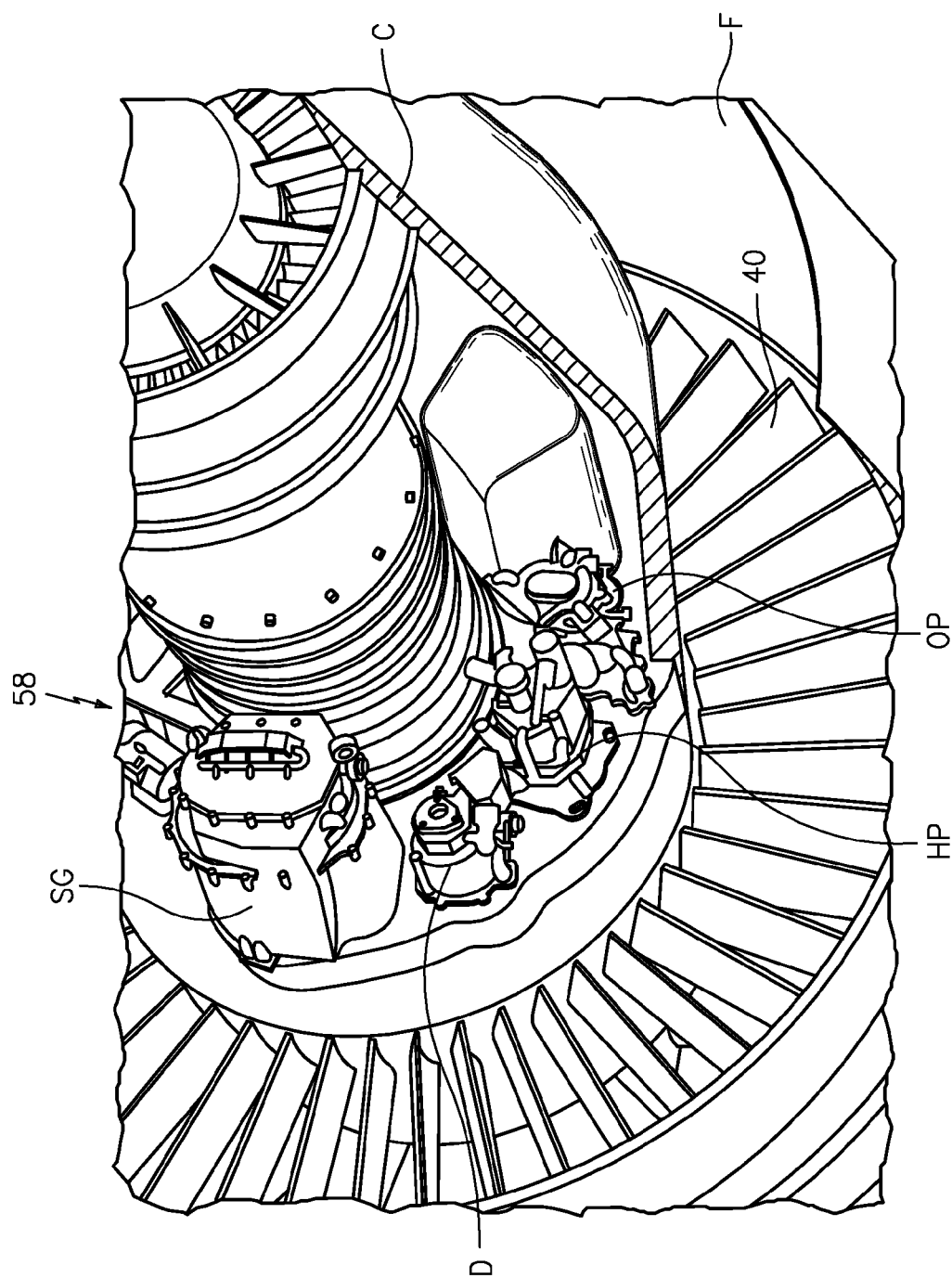
FIG. 2C is an underside starboard view of a gas turbine engine opposite FIG. 2B looking forward to illustrate the stacking of accessory components with the intermediate case.

Referring to FIGS. 2A-2C, the IMC 48 may include an accessory gearbox case section 60 mounted thereto. The accessory gearbox case section 60 may be integral with or attachable to the IMC 48 or alternatively other engine static structure 44. The integrated accessory gearbox case section 60 provides significant axial and radial area within the core nacelle C aft of the FEGVs 40 to support an engine accessory system 58 which may include accessory components ACs such as a starter/generator SG, a deoiler D, a hydraulic pump HP, an oil pump OP, an integrated oil tank OT, a fuel pump FP and others (FIGS. 2B-2C) which thereby saves weight and space within the core nacelle C. It should be understood, that any number and type of accessory components AC may alternatively or additionally be provided.

Figure 3A:
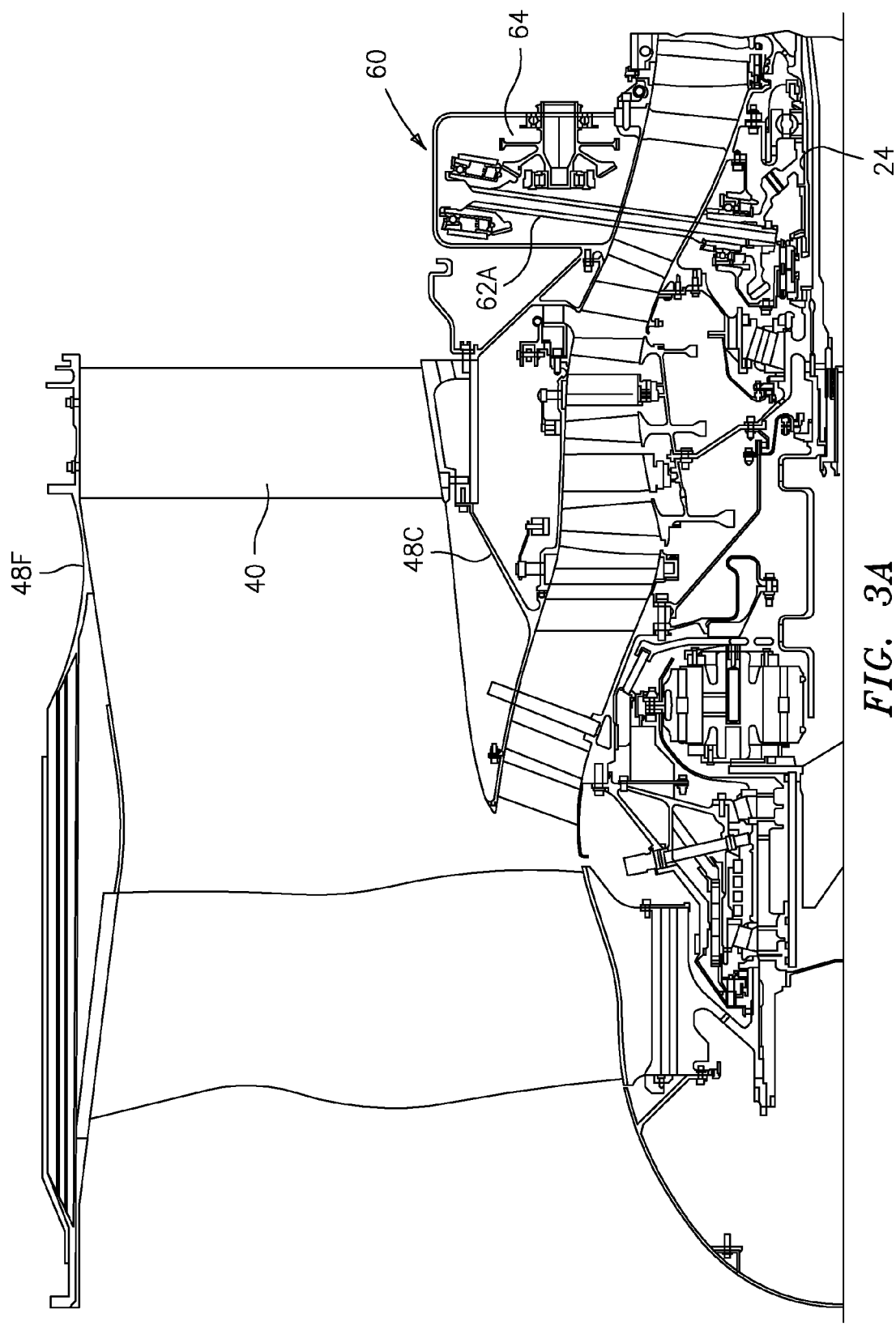
FIG. 3A is a side sectional view of the accessory gearbox.
Figure 3B:
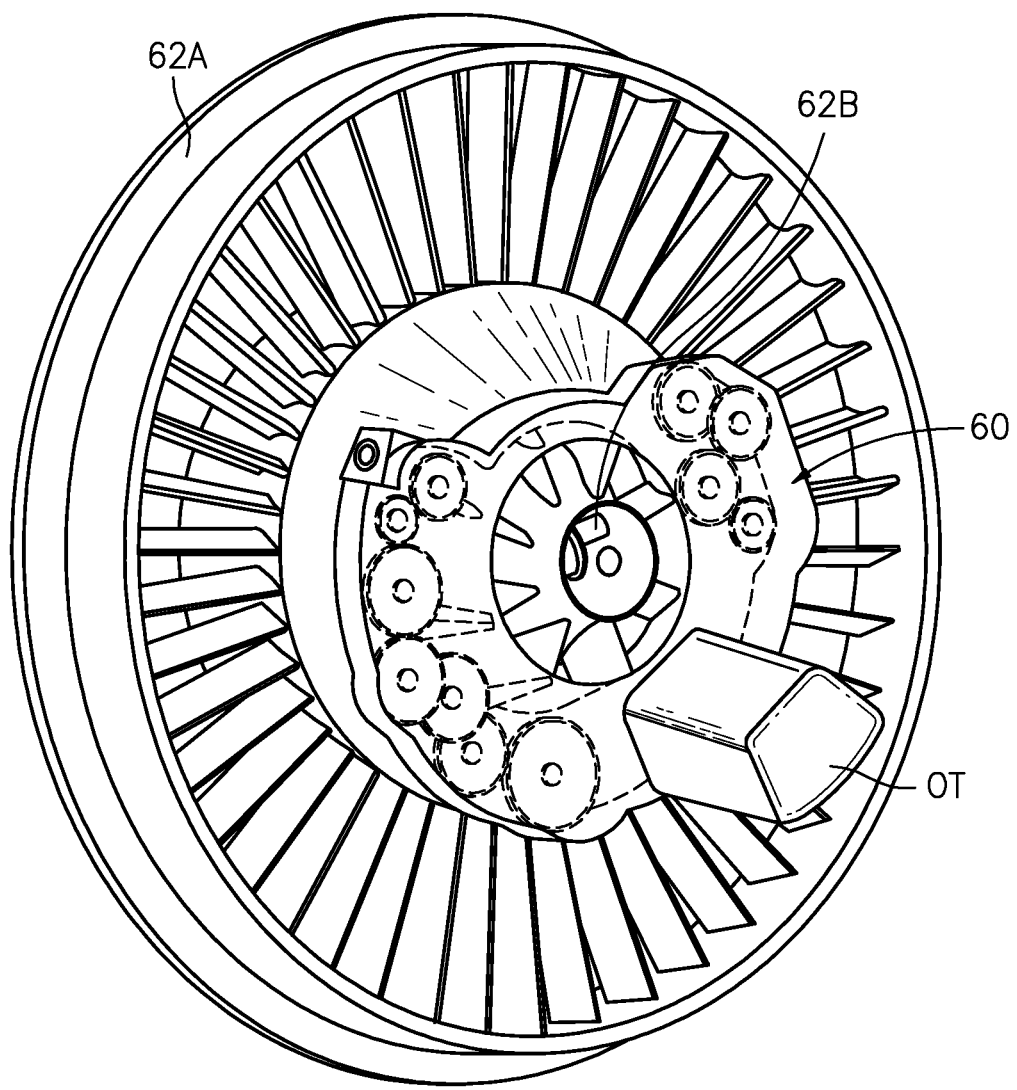
FIG. 3B is a perspective view of the accessory gearbox.

Referring to FIG. 3A, the accessory gearbox case section 60 includes a geartrain 64 which, in one non-limiting embodiment, is driven directly by a first and second towershaft 62A, 62B to eliminate the conventionally required layshafts (also illustrated in FIG. 3B) which take power off of the high spool 24. In some embodiments, one or both of the towershafts may be driven off of the low spool shaft as well.

The twin towershafts 62A, 62B facilitate usage of generators which may be taller than they are wider (when viewed along the centerline) to be placed, for example, at the 3 and 9 o'clock position where there is more room for the more powerful "tall" generators. The twin towershaft 62A, 62B permit each to be of a lesser size than a conventional single towershaft and therefore have a lesser impact on the core airflow passages to increase engine performance. The twin towershaft 62A, 62B arrangement further facilitates driving one of the generators from the low spool to minimize the operability impact to the high spool.

The accessory gearbox case section 60 supports the geartrain 64 which drives the accessory components ACs. The geartrain 64 within the accessory gearbox case section 60 drives the accessory components ACs at the proper speed. The accessory gearbox case section 60 locates the accessory components AC forward within the core nacelle which provides a relatively lower temperature operating environment than the conventional mounting location proximate the combustor. The IMC 48 in one non-limiting embodiment may form or support the integrated oil tank OT. This arrangement frees up additional space within the core nacelle below the engine case structure for other externals.

Figure 4:
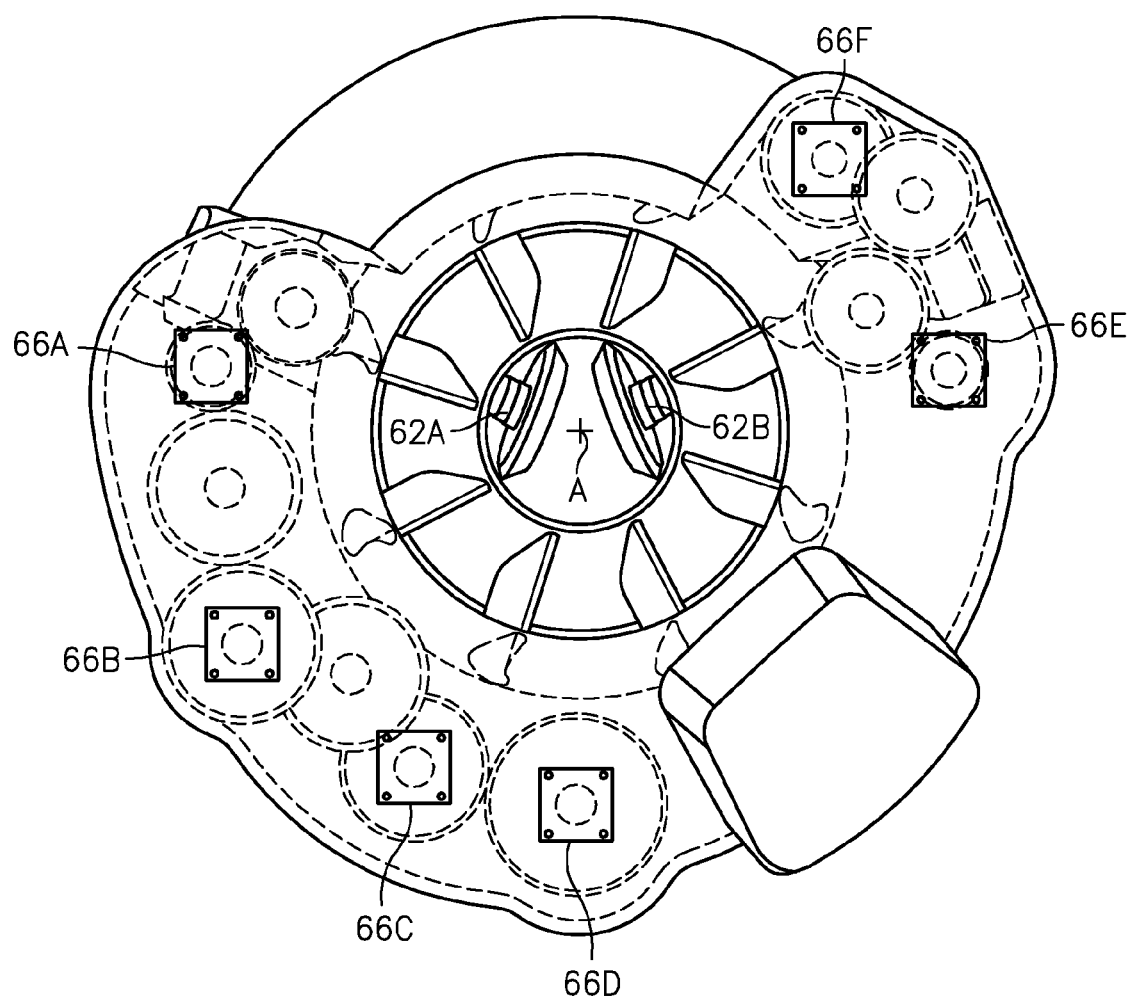
FIG. 4 is a rear partial phantom view of the accessory gearbox.

Referring to FIG. 4, the accessory gearbox case 60 may include various access panels. An accessory component pad 66A-66F supports the associated accessory component AC (FIGS. 2A-2C) aft thereof and circumferentially around the axis A. Each accessory component pad 66A-66F may support one or more accessory component AC.

Figure 5A:
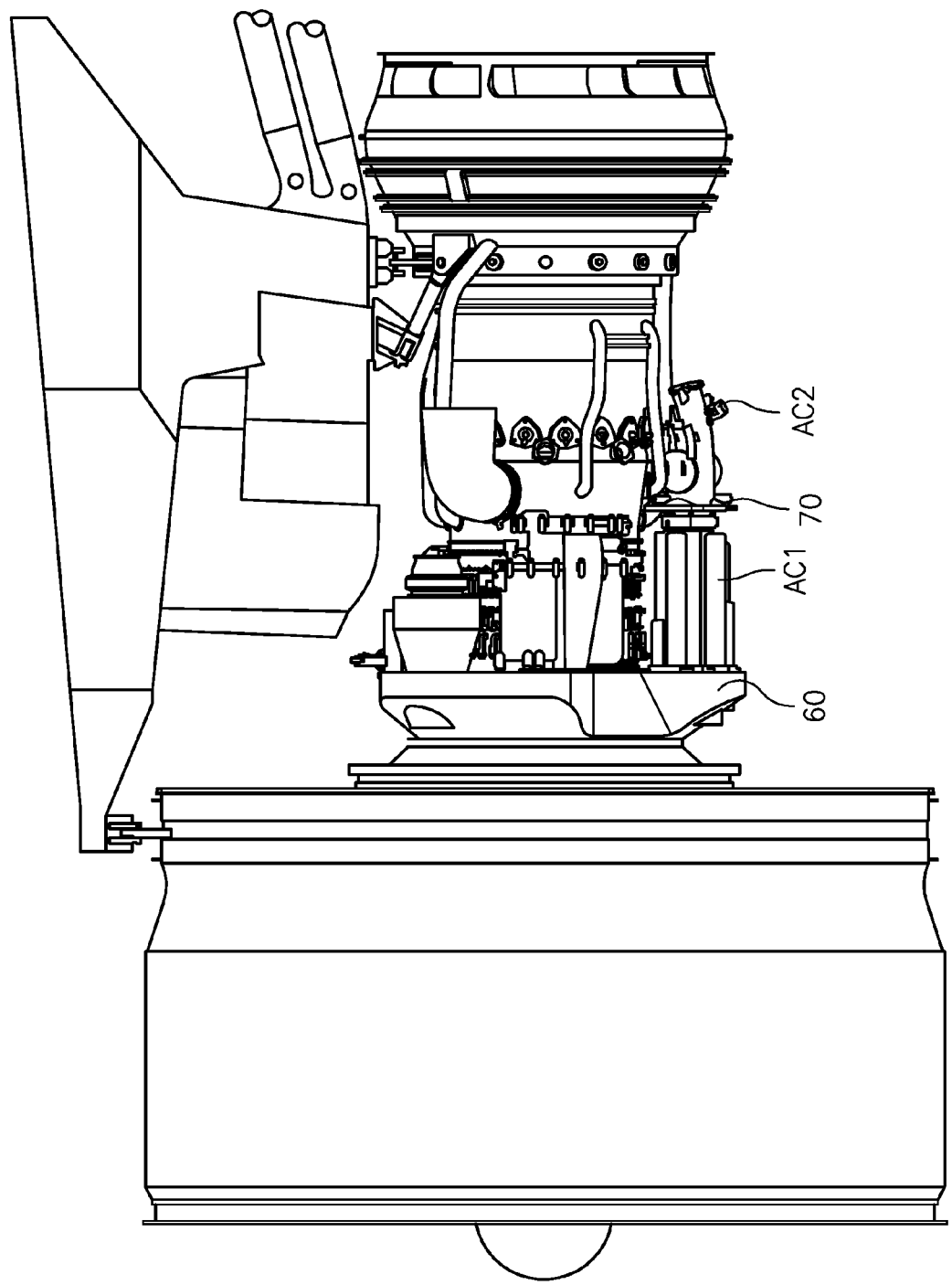
FIG. 5A is a general perspective view of a gas turbine engine with a stacked engine accessory system.

Referring to FIG. 5A, a first accessory component AC1 is mounted directly to the accessory gearbox case section 60 and pad as described above. A second accessory component AC2 is mounted to an end section of the first accessory component AC1 along an accessory axis Z through a transfer gearbox 70 to drive the second accessory component AC2 at an appropriate speed. The accessory axis Z is generally parallel to the engine axis A such that the second accessory component AC2 is stacked on the first accessory component AC1 with the transfer gearbox 70 therebetween.

In one non-limiting embodiment, the lighter weight accessory component is stacked farther outboard relative the accessory gearbox case section 60. It should be understood, that any number and type of accessory components AC may alternatively or additionally be stacked as well.

Figure 5B:
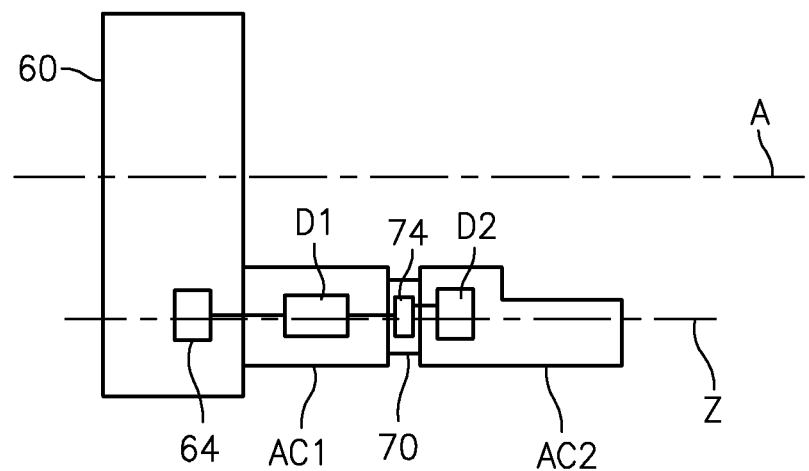
FIG. 5B is a schematic view of a stacked engine accessory system.

Referring to FIG. 5B, the first accessory component AC1 drive system D1 not found is driven by the accessory gearbox case section 60. The drive system D1 provides an output which drives the transfer gearbox 70. The transfer gearbox 70 includes a gear system 74 which may step-up or step-down to the appropriate speed and horsepower for a drive system D2 of the second accessory component AC2. The transfer gearbox 70 may also provide an output which facilitates the second accessory component AC2 being essentially plugged in generally as the first accessory component AC1 plugs into the accessory gearbox case section 60. The stacked accessory components may be supported at both the drive-mounted end (stacked end) and the non-drive end section with various bracketry which increases accessory component support and retention as well as a reduction in weight of the overall retention system. Referring to FIG. 5B, this arrangement may alternatively be utilized without the transfer gearbox 70 to connect AC2 directly to the back of AC1 such that both components operate at the same speed.

As earlier stated, the transfer gearbox 70 is operable to step-up or step-down to the appropriate speed and horsepower for the second accessory component AC2. For example only, a lube pump LP may be the first accessory component AC1 which is driven at approximately 3800 RPM by the accessory gearbox case section 60. The second accessory component AC2 may be a hydraulic pump HP which is driven at approximately 5600 RPM through the transfer gearbox 70. That is, the first accessory component AC1 is driven by the accessory gearbox case section 60, the transfer gearbox 70 is driven by an output from the first accessory component AC1 and the second accessory component AC2 is driven by the transfer gearbox 70 which steps-up the speed to the appropriate speed for the second accessory component AC2.

Figure 6B:
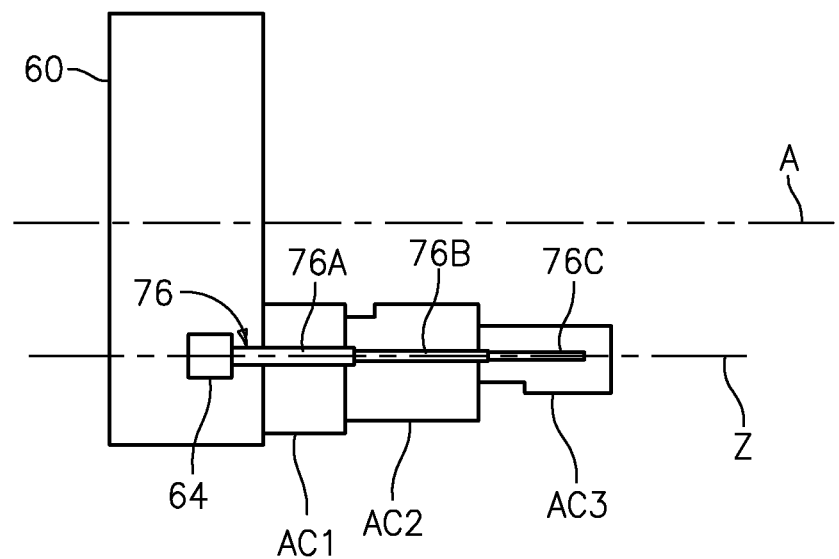
FIG. 6B is a schematic view of another embodiment of a stacked engine accessory system.
Figure 6A:
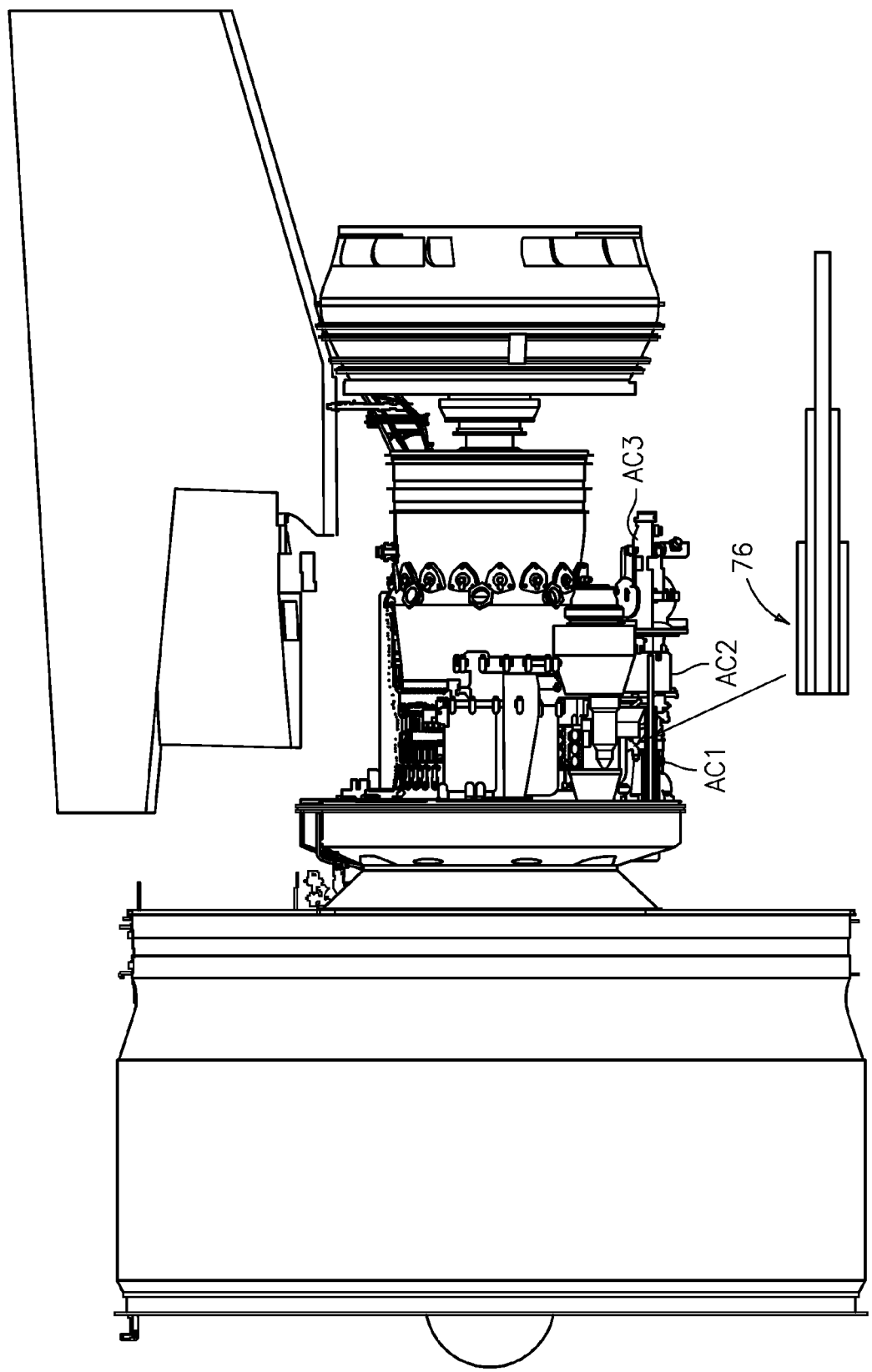
FIG. 6A is a general perspective view of a gas turbine engine with another embodiment of a stacked engine accessory system.

Referring to FIG. 6A, a first accessory component AC1 is mounted to the accessory gearbox case section 60 as described above. A second accessory component AC2 is mounted to an end section of the first accessory component AC1 and a third accessory component AC3 may be mounted to the second accessory component AC2. A concentric drive shaft 76 driven by the accessory gearbox case section 60 extends through the accessory components AC1, AC2, AC3 to provide a power take off for each accessory components AC1, AC2, AC3 (FIG. 6B). The drive shaft 76 may include concentric shafts 76A, 76B, 76C which drive the respective accessory component AC1, AC2, AC3. The various speeds and horsepower required for each accessory components AC1, AC2, AC3 may be provided by the drive system within each accessory components AC1, AC2, AC3. Alternatively, the shafts of the concentric drive shaft 76 may be driven at different speeds by the accessory gearbox case section 60.

The shafts of the concentric drive shaft 76 facilitate redundant failsafe operation of the accessory components AC1, AC2, AC3 should any one of the individual shafts 76A, 76B, 76C fail as the other shafts 76A, 76B, 76C will continue to power their respective accessory component AC1, AC2, AC3.

Stacking accessory components AC facilitates occupation of the axial space along the engine rather than tangential space around the engine, which is traditionally crowded due to the large number of bleed ports, linkages, and components mounted to the compressor case section of the engine.

Stacking accessory components may also reduce the weight of the accessory system through reduction in the gearbox weight and accessory component weight. Furthermore, greater flexibility in accessory component placement is facilitated.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An engine accessory system for a gas turbine engine comprising:
   a nacelle assembly comprising a core nacelle that surrounds a core engine and a fan nacelle that at least partially surrounds said core nacelle;
   a fan case surrounded by said fan nacelle, said fan case defining a fan case outermost diameter;
   an intermediate case mounted between said fan case and a high pressure compressor case, said intermediate case defined by an outermost diameter that is less than said fan case outermost diameter at an aft end of said fan case;
   an accessory gearbox case section formed as part of said intermediate case and configured to be positioned within said core nacelle, the accessory gearbox including a geartrain;
   a first accessory component defined along an accessory axis; and
   a second accessory component mounted to said first accessory component along said accessory axis, said first and second accessory components mounted to said accessory gearbox case section and driven by said geartrain.

2. The engine accessory system as recited in claim 1, wherein said accessory axis is parallel to a gas turbine engine axis of rotation.

3. The engine accessory system as recited in claim 1, further comprising a transfer gearbox between said second accessory component and said first accessory component.

4. The engine accessory system as recited in claim 1, further comprising a transfer gearbox between said second accessory component and said first accessory component, said second accessory component driven by said transfer gearbox.

5. The engine accessory system as recited in claim 1, further comprising a driveshaft parallel to said accessory axis to drive at least said second accessory component.

6. The engine accessory system as recited in claim 5, further comprising an accessory gearbox driven by the gas turbine engine, said driveshaft driven by said accessory gearbox.

7. The engine accessory system as recited in claim 5, wherein said driveshaft is concentric with a driveshaft that drives said first accessory component.

8. The engine accessory system as recited in claim 1, further comprising a driveshaft parallel to said accessory axis to drive said first accessory component and said second accessory component.

9. A gas turbine engine comprising:
   a fan case section defined about an engine axis, said fan case section including a fan nacelle surrounding a fan case defined by a fan case outermost diameter;
   a core case section attached to said fan case section, said core case section defined about said axis, said core case section including a core nacelle surrounding a core engine, and wherein said fan case section at least partially surrounds said core nacelle;
   an intermediate case mounted between said fan case and a high pressure compressor case, said intermediate case defined by an outermost diameter that is less than said fan case outermost diameter at an aft end of said fan case;
   an accessory gearbox case section formed as part of said intermediate case and mounted within said core nacelle;
   a geartrain within said accessory gearbox case section;
   a first accessory component mounted to said accessory gearbox case section along an accessory axis generally parallel to said engine axis, said first accessory component driven by said geartrain; and
   a second accessory component mounted to said first accessory component along said accessory axis.

10. The gas turbine engine as recited in claim 9, further comprising a multiple of fan exit guide vanes mounted to said fan case section and said core case section, said accessory gearbox case section aft of said multiple of fan exit guide vanes.

11. The gas turbine engine as recited in claim 9, wherein said at least one accessory component is mounted at least partially within a diameter defined by said intermediate case core section.

12. The gas turbine engine as recited in claim 9, further comprising a transfer gearbox between said second accessory component and said first accessory component, said second accessory component driven by said transfer gearbox.

13. The gas turbine engine as recited in claim 9, further comprising a driveshaft parallel to said accessory axis to drive at least said second accessory component.

14. The gas turbine engine as recited in claim 9, further comprising at least first and second tower shafts configured to drive said geartrain.

15. The gas turbine engine as recited in claim 14, wherein said first and second tower shafts are non-concentric.

16. The gas turbine engine as recited in claim 15, wherein said first tower shaft extends radially outwardly from said engine axis at a first location and said second tower shaft extends radially outwardly from said engine axis at a second location circumferentially spaced from said first location.

17. The gas turbine engine as recited in claim 14, further comprising a low speed shaft coupled to a low pressure compressor and a low pressure turbine and a high speed shaft coupled to a high pressure compressor and high pressure turbine, and wherein said first and second tower shafts are driven by said high speed shaft.

18. The gas turbine engine as recited in claim 9, further comprising a third accessory component mounted to said second accessory component along said accessory axis.

19. The gas turbine engine as recited in claim 18, further comprising a first drive shaft driven by said geartrain and configured to drive said first accessory component, a second drive shaft configured to drive said second accessory component, and a third drive shaft configured to drive said third accessory component, and wherein said first, second and third drive shafts are concentric with each other.

20. The gas turbine engine as recited in claim 9, wherein said accessory gear box case section is integrally formed with said intermediate case.

21. The engine accessory system as recited in claim 1, further comprising at least first and second tower shafts positioned within said accessory gearbox case section and configured to drive said geartrain.

22. The engine accessory system as recited in claim 21, wherein said first and second tower shafts are non-concentric.

23. The engine accessory system as recited in claim 22, wherein said first tower shaft extends radially outwardly from a central engine axis at a first location and said second tower shaft extends radially outwardly from said engine axis at a second location circumferentially spaced from said first location.

24. The engine accessory system as recited in claim 1, further comprising a third accessory component mounted to said second accessory component along said accessory axis.

25. The engine accessory system as recited in claim 24, further comprising a first drive shaft driven by said geartrain and configured to drive said first accessory component, a second drive shaft configured to drive said second accessory component, and a third drive shaft configured to drive said third accessory component, and wherein said first, second and third drive shafts are concentric with each other.

26. The engine accessory system as recited in claim 1, wherein said accessory gear box case section is integrally formed with said intermediate case.

27. The engine accessory system as recited in claim 1, wherein said core nacelle surrounds and encloses said accessory gearbox case section.

28. The engine accessory system as recited in claim 1, including a plurality of fan exit guide vanes extending radially between a fan section and a core section, and wherein said accessory gearbox case section is mounted within said core nacelle downstream of the fan exit guide vanes.

29. The gas turbine engine as recited in claim 9, wherein said core nacelle surrounds and encloses said accessory gearbox case section.

30. The gas turbine engine as recited in claim 9, including a plurality of fan exit guide vanes extending radially between the fan case section and the core case section, and wherein said accessory gearbox case section is mounted within said core nacelle downstream of the fan exit guide vanes.

* * * * *

UNITED STATES PATENT AND TRADEMARK OFFICE
CERTIFICATE OF CORRECTION

PATENT NO. : 9,816,441 B2  
APPLICATION NO. : 12/413634  
DATED : November 14, 2017  
INVENTOR(S) : Michael F. Cass et al.

Page 1 of 1

It is certified that error appears in the above-identified patent and that said Letters Patent is hereby corrected as shown below:

In the Claims

In Claim 1, Column 5, Line 38; replace "the accessory gearbox" with --an accessory gearbox case section--

In Claim 11, Column 6, Line 35; replace "said at least one accessory component" with --a first accessory component and a second accessory component--

In Claim 11, Column 6, Line 37; replace "said intermediate case core section." with --said intermediate case--

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*